US006639722B2

(12) United States Patent
Amm et al.

(10) Patent No.: US 6,639,722 B2
(45) Date of Patent: Oct. 28, 2003

(54) STRESS TUNED BLAZED GRATING LIGHT VALVE

(75) Inventors: David T. Amm, Kingston (CA); Christopher Gudeman, Los Gatos, CA (US); James Hunter, Campbell, CA (US)

(73) Assignee: Silicon Light Machines, Sunnyvale, CA (US)

( * ) Notice: Subject to any disclaimer, the term of this patent is extended or adjusted under 35 U.S.C. 154(b) by 30 days.

(21) Appl. No.: 09/930,820

(22) Filed: Aug. 15, 2001

(65) Prior Publication Data

US 2003/0035189 A1 Feb. 20, 2003

(51) Int. Cl.⁷ .............................. G02B 5/18; G02B 26/00
(52) U.S. Cl. ........................ 359/571; 359/291; 359/566; 359/573
(58) Field of Search ................................ 359/571, 572, 359/573, 290, 291, 254, 298, 563, 566, 569, 575

(56) References Cited

U.S. PATENT DOCUMENTS

| 3,886,310 A | 5/1975 | Guldberg et al. | 178/7.5 D |
| 4,566,935 A | 1/1986 | Hornbeck | 156/626 |

(List continued on next page.)

FOREIGN PATENT DOCUMENTS

| WO | WO 96/08031 | 3/1996 | H01J/29/12 |
| WO | WO 99/67671 | 12/1999 | G02B/26/08 |

OTHER PUBLICATIONS

Apte et al., "Deformable Grating Light Valves for High Resolution Displays," Solid State Actuator Workshop, Hilton Head, South Carolina, Jun. 13–16, 1994.

Sene et al., "Polysilicon micromechanical gratings for optical modulation," Sensors and Actuators, vol. A57, pp. 145–151, 1996.

Amm et al., "*Invited Paper*: Grating Light Valve™ Technology: Update and Novel Applications," SID Digest, vol. 29, 1998.

"Micromachined Opto/Electro/Mechanical Systems," Electronic Systems, NASA Tech Briefs, Mar. 1997, pp. 50 & 52.

David M. Burns et al., "Development of Microelectromechanical Variable Blaze Gratings," Sensors and Actuators A 64 (1998), pp. 7–15.

"Development of Digital MEMS–Based Display Technology Promises Improved Resolution, Contrast, And Speed", XP–000730009, 1997, p. 33.

Solgaard, O., *Integrated semiconductor light modulators for fiber–optic and display applications*, Ph.D. Dissertation, Stanford University, Feb. 1992.

Apte, R.B., *Grating light valves for high resolution displays*, Ph.D. Dissertation, Stanford University, Jun. 1994.

Burns, D.M. et al., *Development of microelectromechanical variable blaze gratings*, Sensors and Actuators A, pp. 7–15, 1998.

Primary Examiner—Georgia Epps
Assistant Examiner—Gary O'Neill
(74) Attorney, Agent, or Firm—Haverstock & Owens LLP

(57) ABSTRACT

A light modulator includes elongated elements arranged parallel to each other and suspended above a substrate. The light modulator operates in a first diffraction mode and in a second diffraction mode. In the first diffraction mode, an incident light diffracts into a single diffraction order. Each of the elongated elements comprises a central blazed portion, a first outer blaze transition, and a second outer blaze transition. The central blaze portion, couples the first outer blaze transition to the second outer blaze transition. Each of the central blazed portions comprises a reflective surface. Selected ones of the central blazed portions comprise a first conductive element. The first outer blaze transition and the second outer blaze transition are coupled to the substrate.

25 Claims, 10 Drawing Sheets

U.S. PATENT DOCUMENTS

| | | | |
|---|---|---|---|
| 4,571,603 A | 2/1986 | Hornbeck et al. | 346/160 |
| 4,710,732 A | 12/1987 | Hornbeck | 332/7.51 |
| 5,182,665 A | 1/1993 | O'Callaghan et al. | 359/95 |
| 5,296,891 A | 3/1994 | Vogt et al. | 355/67 |
| 5,311,360 A | 5/1994 | Bloom et al. | 359/572 |
| 5,459,610 A | 10/1995 | Bloom et al. | 359/572 |
| 5,485,304 A | 1/1996 | Kaeriyama | 359/291 |
| 5,629,801 A | 5/1997 | Staker et al. | 359/572 |
| 5,661,592 A | 8/1997 | Bornstein et al. | 359/291 |
| 5,691,836 A | 11/1997 | Clark | 359/247 |
| 5,757,536 A | 5/1998 | Ricco et al. | 359/224 |
| 5,808,797 A | 9/1998 | Bloom et al. | 359/572 |
| 5,841,579 A | 11/1998 | Bloom et al. | 359/572 |
| 5,847,859 A * | 12/1998 | Murata | 359/201 |
| 5,926,309 A | 7/1999 | Little | 359/293 |
| 5,949,570 A | 9/1999 | Shiono et al. | 359/291 |
| 5,982,553 A | 11/1999 | Bloom et al. | 359/627 |
| 5,986,796 A | 11/1999 | Miles | 359/260 |
| 5,999,319 A | 12/1999 | Castracane | 359/573 |
| 6,061,166 A | 5/2000 | Furlani et al. | 359/254 |
| 6,071,652 A | 6/2000 | Feldman et al. | 430/5 |
| 6,169,624 B1 | 1/2001 | Godil et al. | 359/237 |
| 6,172,796 B1 * | 1/2001 | Kowarz et al. | 359/290 |
| 6,181,458 B1 | 1/2001 | Brazas, Jr. et al. | 359/290 |
| 6,188,519 B1 | 2/2001 | Johnson | 359/572 |
| 6,195,196 B1 | 2/2001 | Kimura et al. | 359/295 |
| 6,215,579 B1 * | 4/2001 | Bloom et al. | 359/298 |
| 6,219,015 B1 | 4/2001 | Bloom et al. | 345/87 |
| 6,229,650 B1 | 5/2001 | Reznichenko et al. | 359/566 |
| 6,252,697 B1 | 6/2001 | Hawkins et al. | 359/290 |
| 6,268,952 B1 * | 7/2001 | Godil et al. | 359/291 |
| 6,396,789 B1 | 5/2002 | Guerra et al. | 369/112 |
| 6,445,502 B1 * | 9/2002 | Islam et al. | 359/571 |
| 2002/0015230 A1 | 2/2002 | Pilossof et al. | 359/558 |
| 2002/0021485 A1 | 2/2002 | Pilossof | 359/295 |
| 2002/0079432 A1 | 6/2002 | Lee et al. | 250/216 |
| 2002/0105725 A1 | 8/2002 | Sweatt et al. | 359/566 |

\* cited by examiner

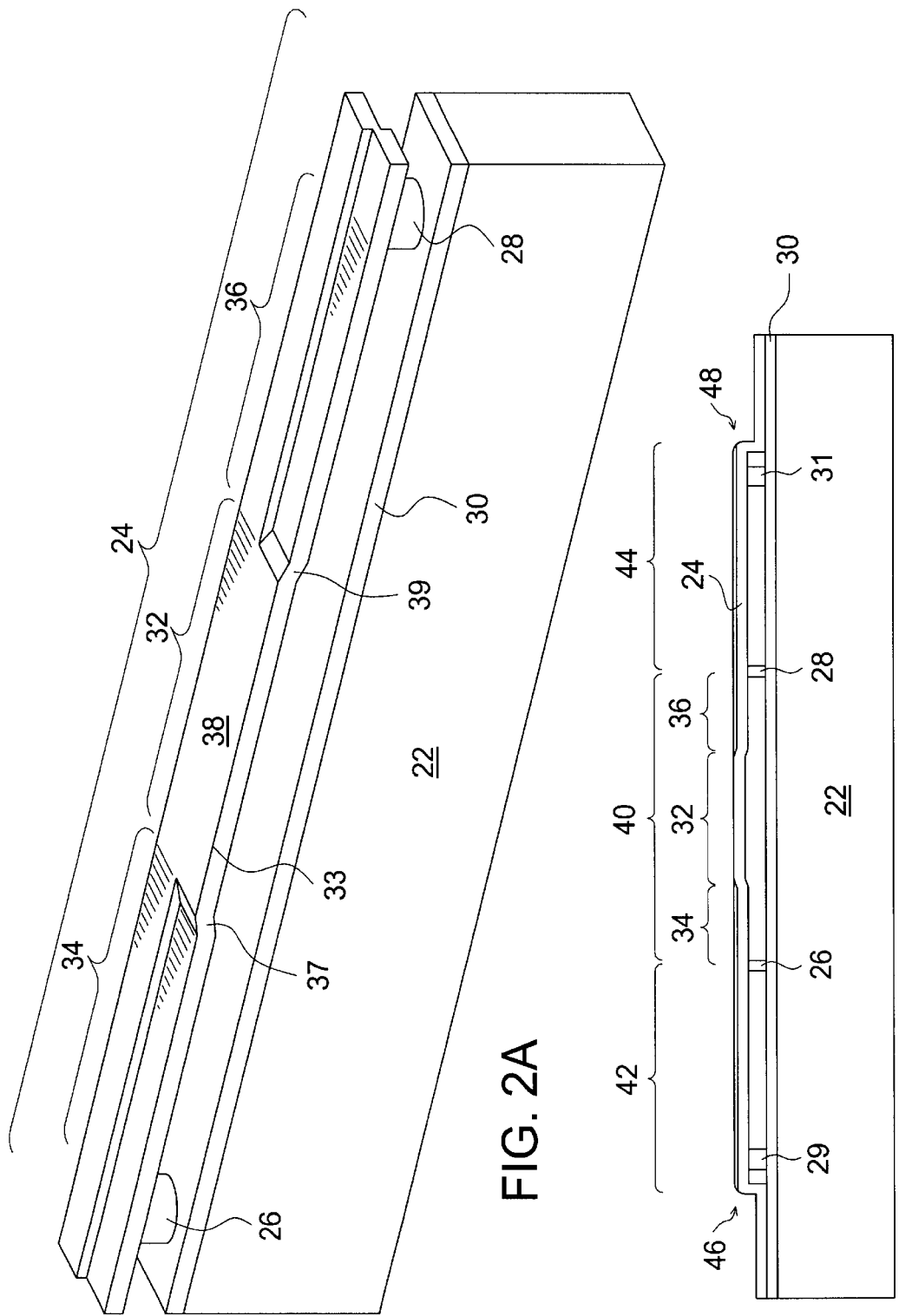

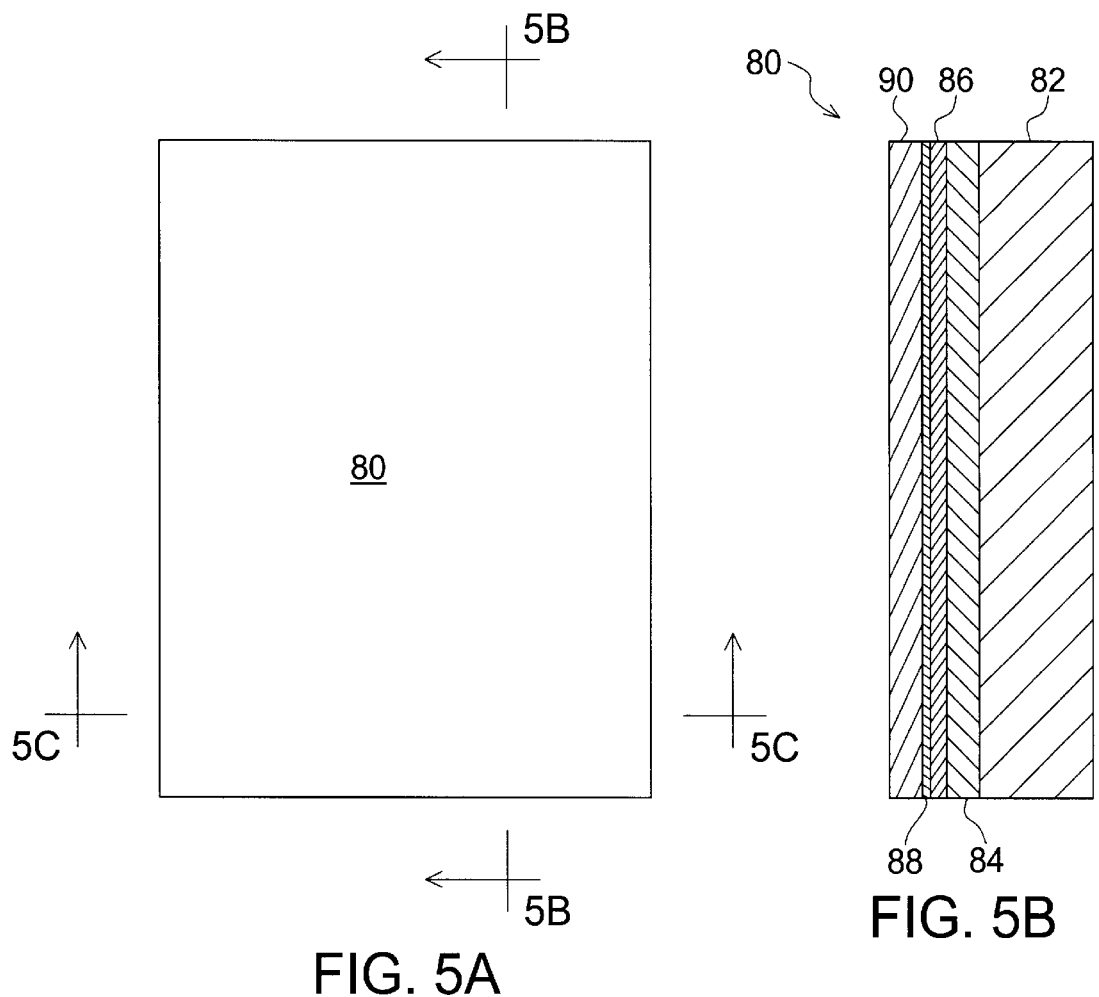
FIG. 5A
FIG. 5B
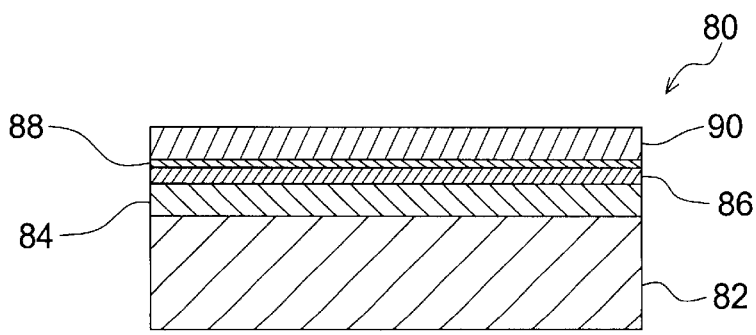
FIG. 5C

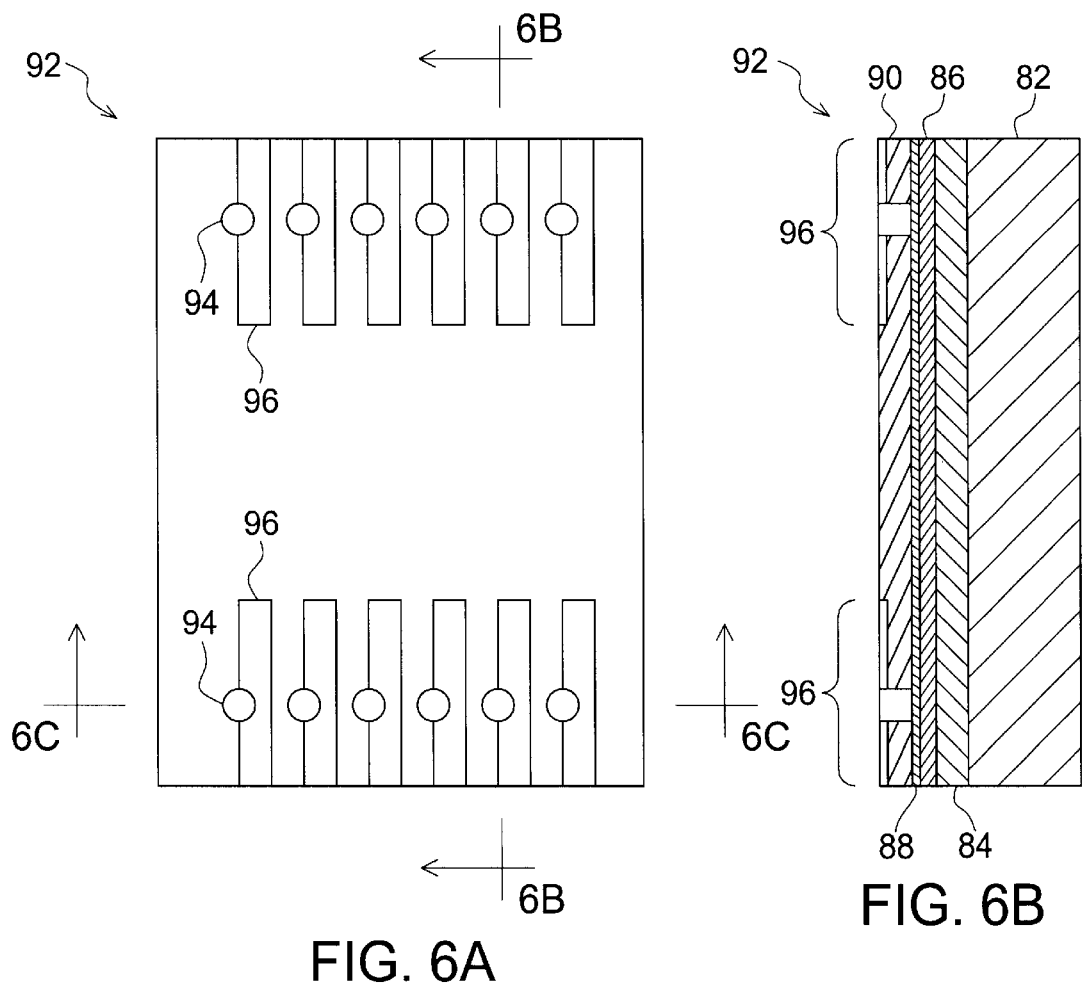
FIG. 6A
FIG. 6B
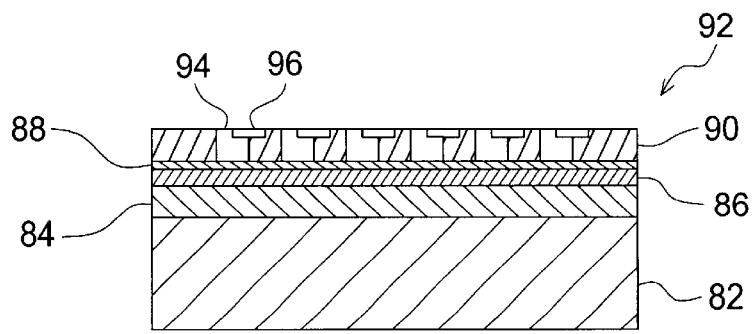
FIG. 6C

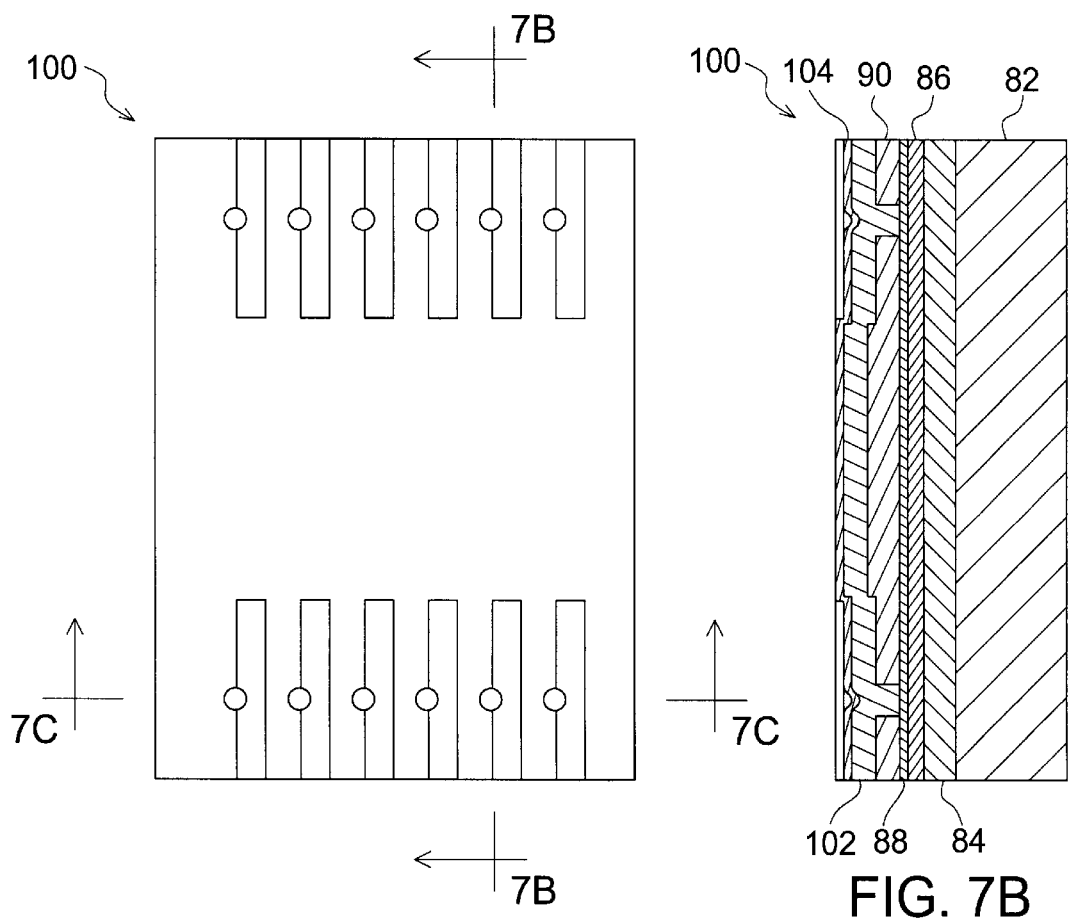
FIG. 7A
FIG. 7B
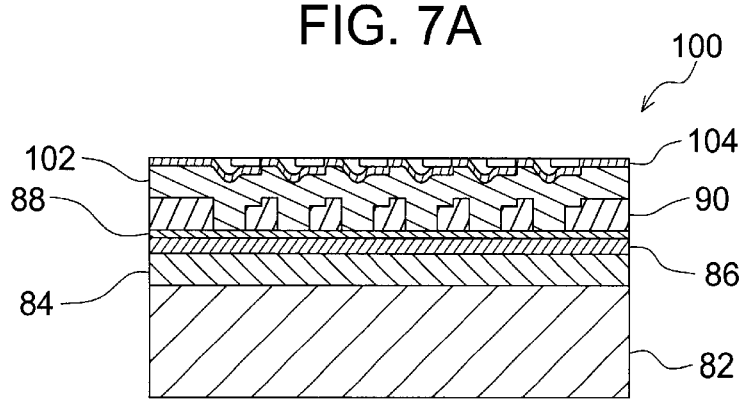
FIG. 7C

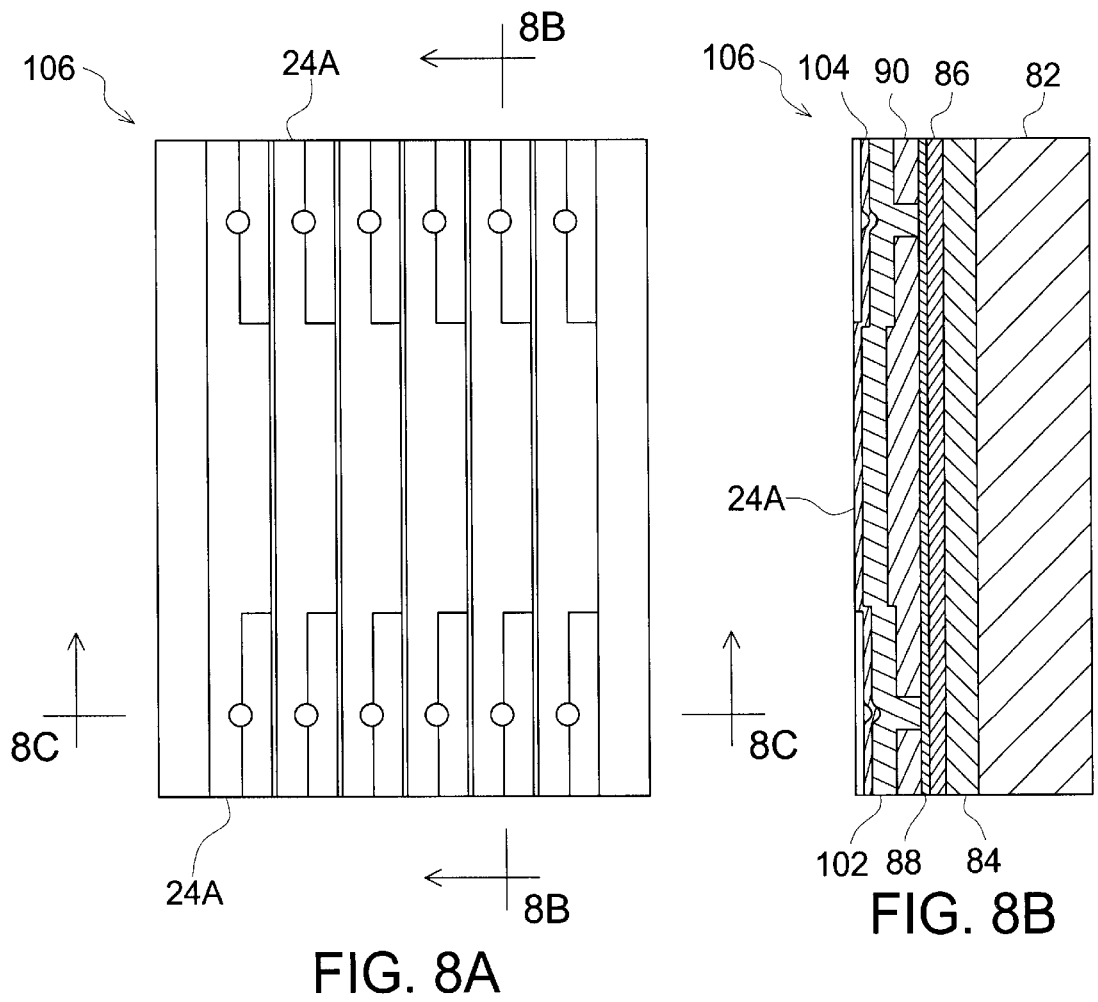
FIG. 8A
FIG. 8B
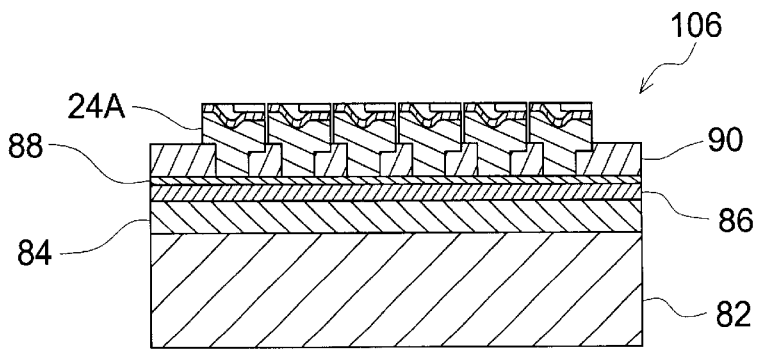
FIG. 8C

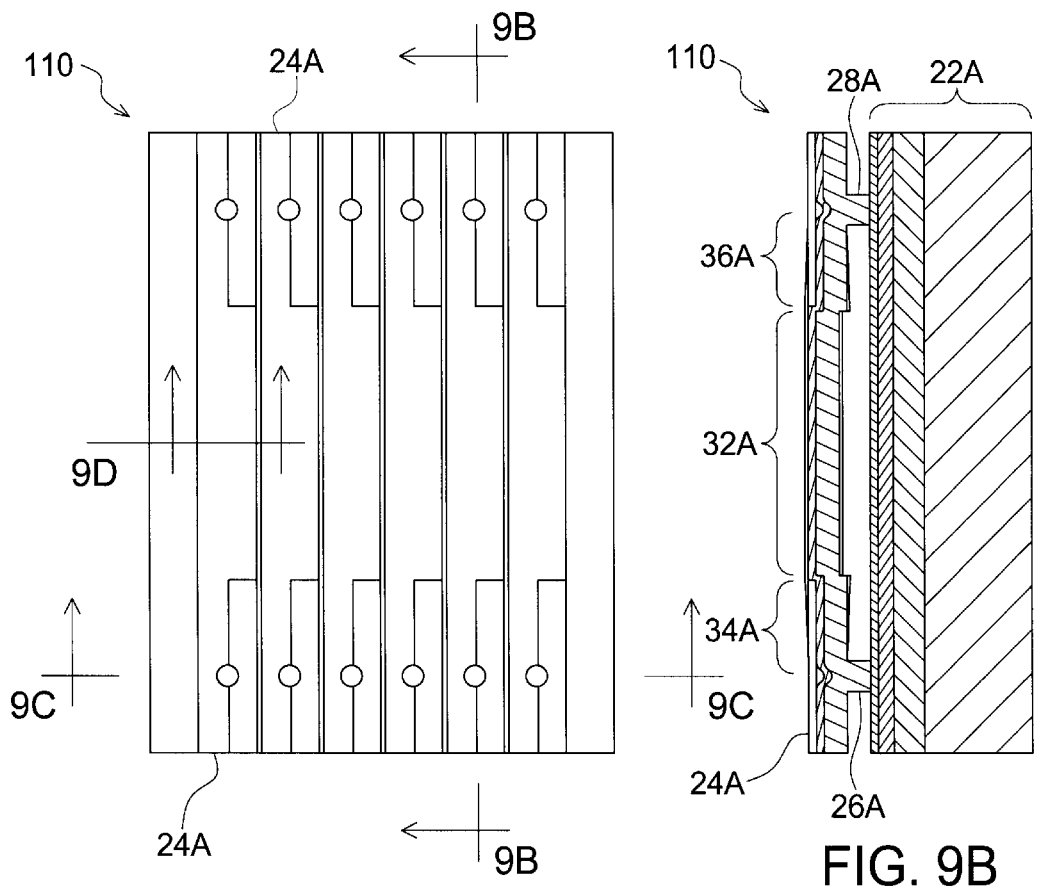
FIG. 9A
FIG. 9B
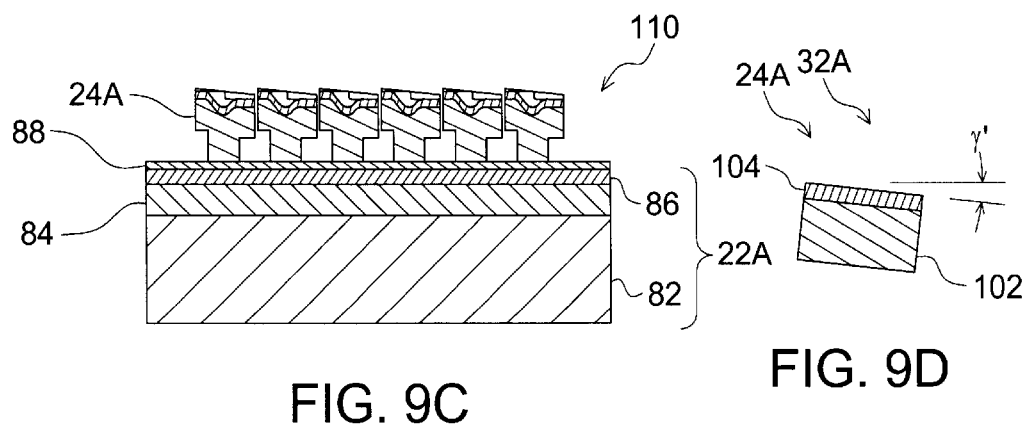
FIG. 9C
FIG. 9D

STRESS TUNED BLAZED GRATING LIGHT VALVE

FIELD OF THE INVENTION

This invention relates to the field of light modulators. More particularly, this invention relates to the field of light modulators where an incident light is modulated to produce a blazed diffraction.

BACKGROUND OF THE INVENTION

Bloom et al. in U.S. Pat. No. 5,311,360, entitled "Method and apparatus for modulating a light beam," teach a grating light valve which operates in a reflection mode and a diffraction mode. The grating light valve includes elongated elements suspended above a substrate. In the reflective mode, reflective surfaces of the grating light valve cause incident light to constructively combine to form reflected light. In the diffractive mode, the reflective surfaces of the grating light valve are separated by a quarter wavelength of the incident light to produce diffracted light. When the grating light valve is in the diffractive mode, the grating light valve predominantly diffracts light into a plus one diffraction order and a minus one diffraction order but also diffracts a small amount of light into higher diffraction orders.

Bloom et al. further teach an alternative grating light valve which operates in the reflection mode and in a blazed diffraction mode. The alternative grating light valve includes the elongated elements suspended above the substrate. For the alternative grating light valve, the elongated elements include off-axis neck portions at ends of each of the elongated elements. In the reflection mode, the elongated elements are parallel causing incident light to reflect from the elongated elements and, thus, produce the reflected light. In the blazed diffraction mode, each of the elongated elements is rotated about an axis defined by the off-axis neck portions to produce a blazed diffraction.

Because the light modulator is switched between the reflection mode and the blazed diffraction mode and because the reflection mode diffracts small quantities of light into the same angles as does the blazed diffraction mode, a contrast between the nonactivated state and the activated state is less than an optimum contrast. Further, the off-axis neck portions are critical to operation of the light modulator which necessitate tight tolerances for the off-axis neck portions making the light modulator relatively difficult to fabricate and also relatively expensive to fabricate.

What is needed is a blazed diffractive light modulator which provides higher contrast.

What is needed is a blazed diffractive light modulator which is easier to fabricate.

What is needed is a blazed diffractive light modulator which is more economical to fabricate.

SUMMARY OF THE INVENTION

The present invention is a light modulator. The light modulator includes elongated elements arranged parallel to each other and suspended above a substrate. The light modulator operates in a first diffraction mode and in a second diffraction mode. In the first diffraction mode, an incident light diffracts into at least two diffraction orders. In the second diffraction mode, the incident light diffracts into a single diffraction order, which is at a diffraction angle different from diffraction angles for the at least two diffraction orders.

Each of the elongated elements comprises a central blazed portion, a first outer blaze transition, and a second outer blaze transition. The central blaze portion couples the first outer blaze transition to the second outer blaze transition. Each of the central blazed portions comprises a reflective surface. Selected ones of the central blazed portions comprise a first conductive element. The first outer blaze transition and the second outer blaze transition are coupled to the substrate. The substrate comprises a second conductive element.

The elongated elements produce the first diffraction when a first electrical bias, preferably a zero electrical bias, is applied between the first conductive elements of the selected ones of the elongated elements and the second conductive element. A relative height of the blazed portions are adjusted to produce the second diffraction when a second electrical bias is applied between the first conductive elements of the selected ones of the elongated elements and the second conductive element.

BRIEF DESCRIPTION OF THE DRAWINGS

FIG. 2A illustrates an isometric view of a single elongated element and an underlying substrate of the preferred blazed grating light valve of the present invention.

FIG. 2B further illustrates the single elongated element and the underlying substrate of the preferred blazed grating light valve of the present invention.

FIGS. 5A, 5B, and 5C illustrate a plan view and two orthogonal views, respectively, of a first partially fabricated blazed grating light valve of the present invention.

FIGS. 6A, 6B, and 6C illustrate a plan view and two orthogonal views, respectively, of a second partially fabricated blazed grating light valve of the present invention.

FIGS. 7A, 7B, and 7C illustrate a plan view and two orthogonal views, respectively, of a third partially fabricated blazed grating light valve of the present invention.

FIGS. 8A, 8B, and 8C illustrate a plan view and two orthogonal views, respectively, of a fourth partially fabricated blazed grating light valve of the present invention.

FIGS. 9A, 9B, and 9C illustrate a plan view and two orthogonal views, respectively, of a fabricated blazed grating light valve of the present invention.

FIG. 9D illustrates a cross-section of one of the fabricated elongated elements through the fabricated central blaze portion of FIGS. 9A, 9B, and 9C.

DETAILED DESCRIPTION OF THE PREFERRED EMBODIMENT

Figure 1:
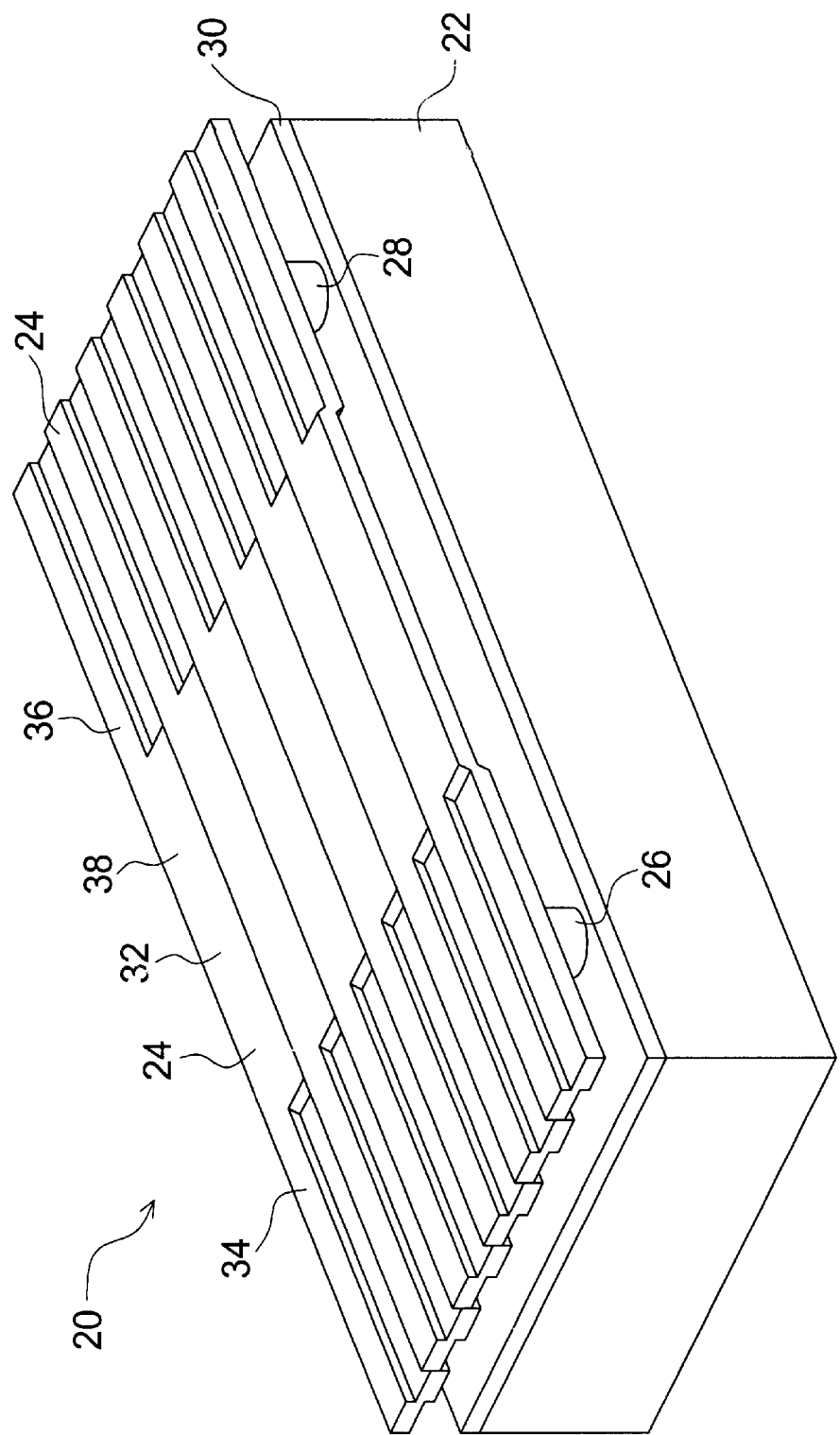
FIG. 1 illustrates an isometric view of the preferred blazed grating light valve of the present invention.

The preferred blazed grating light valve is illustrated in FIG. 1. The preferred blazed grating light valve 20 includes a substrate 22, elongated elements 24, first posts 26 (one shown), and second posts 28 (one shown). The substrate 22 includes a first conductor 30. The elongated elements 24 each include a central blazed portion 32, a first outer blaze transition 34, and a second outer blaze transition 36. One of the first posts 26 and one of the second posts 28 couple each of the elongated elements 24 to the substrate 22. Each of the elongated elements 24 are also preferably coupled at first and second ends (not shown) to the substrate 22. Each of the central blazed portions 32 comprise a reflective surface 38, which is preferably conductive.

One of the elongated elements 24 and a portion of the substrate 22 are further illustrated in FIG. 2A. The elongated element 24 includes the first outer blaze transition 34, the central blazed portion 32, the second outer blaze transition 36, and the reflective surface 38. Preferably, the first outer blaze transition 34, the central blazed portion 32, and the second outer blaze transition 36 are each about a third of the length of the elongated element 24 between the first and second posts, 26 and 28. The elongated element 24 is coupled to the substrate by the first and second posts, 26 and 28.

Preferably, the elongated elements 24, and the first and second posts, 26 and 28, comprise silicon nitride. Preferably, the reflective surface 38 comprises aluminum. Alternatively, the reflective surface 38 comprises a different metal. Further alternatively, the reflective surface 38 comprises a multi-layered dielectric mirror. The substrate 22 includes the first conductor 30. Preferably, the substrate 22 comprises silicon. Alternatively, the substrate 22 comprises a different semiconductor material or an insulating material. Preferably, the first conductor 30 comprises doped poly-silicon. Alternatively, the first conductor 30 comprises a metal. For a visible spectrum application, the elongated element 24 preferably has a width of about 4.25 μm and a length of about 200 μm between the first and second posts, 26 and 28.

The first and second outer blaze transitions, 34 and 36, cause the central blazed portion 32 to tilt so that a near side 33 of the central blazed portion 32 tilts downward. The tilting of the central blazed portion 32 occurs when the elongated elements 24 are released from an underlying layer during fabrication. The tilting is caused by an internal tensile stress within the elongated element 24 and by rigidities of the elongated element 24 at a first transition 37 between the first outer blaze transition 34 and the central blazed portion and at a second transition 39 between the central blazed portion 32 and the second outer blazed transition 36. The internal tensile stress is counteracted by first and second anchors (not shown).

The elongated element 24 and the substrate 22 are further illustrated in FIG. 2B.

The elongated element 24 preferably comprises a central portion 40 and first and second outer portions, 42 and 44. The first outer portion 44 is preferably coupled to the substrate 22 at the first end 46 and the first post 26. The second outer portion is preferably coupled to the substrate 22 at the second end 48 and the second post 28. Preferably, the first and second outer portions, 42 and 44, are also coupled to the substrate 22 by the first and second anchors, 29 and 31, located proximate to the first and second ends, 46 and 48, respectively. Preferably, the first and second anchors, 29 and 31, have an oval cross-section with a long axis of the oval cross-section oriented parallel to a length of the elongated elements 24. By orienting the long axes of the first and second anchors parallel to the length of the elongated elements 24, the first and second anchors, 29 and 31, are relatively stiff in a tension direction defined by the internal tensile stress within the elongated elements 24.

Preferably, lengths of the first and second outer portion, 42 and 44, are about as long as the central portion 40. Alternatively, the lengths of the first and second outer portion, 42 and 44, are longer or shorter than the central portion 40. The first and second outer portions, 42 and 44, assure uniform fabrication of the elongated elements 24 and the first and second posts, 26 and 28. (Note that due to small feature sizes in FIG. 2B the tilt of the central blazed portion 32 is not shown.)

Figure 3A:
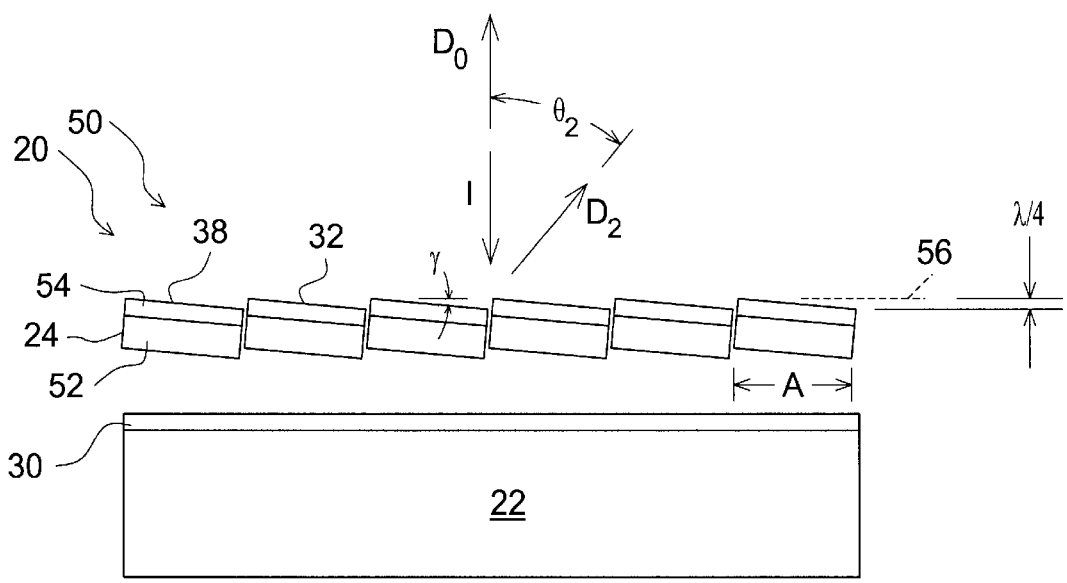
FIGS. 3A and 3B illustrate a cross-sectional view of the preferred blazed grating light valve of the present invention in a non-activated state and in a fully activated state, respectively, with incident light at normal incidence.

A first cross-sectional view of the preferred blazed grating light valve 20 of the present invention is illustrated in FIG. 3A. The first cross-sectional view 50 illustrates the preferred grating light valve 20 in a non-activated state. The central blazed portions 32 of the elongated elements 24 preferably comprise a rectangular body 52 and a metal reflector 54. The rectangular body 52 preferably comprises silicon nitride and the metal reflector 54 preferably comprises aluminum. Each of the central blazed portions 32 is preferably at a blaze angle γ with respect to a grating plane 56. Each of the central blazed portions 32 preferably has a height difference of a quarter wavelength λ/4 of an incident light I between a high edge of the central blazed portion 32 and a low edge of the central blazed portion 32. The central portions 32 are preferably on a grating pitch A. The blaze angle γ is given by the expression: γ=arctan (λ/(4A)).

In the non-activated state, there is preferably a zero electrical bias between the elongated elements 24 and the first conductor 30. The incident light I of the wavelength λ illuminates the preferred blazed grating light valve 20 normal to the grating plane 56. For discussion purposes, the diffraction orders are based on a second grating pitch 2A, which is twice the grating pitch A.

In the non-activated state, the incident light of the wavelength λ is diffracted into a zeroth diffraction order $D_0$ and a second diffraction order $D_2$. The zeroth diffraction order $D_0$ is normal to the grating plane 56. The second order diffraction $D_2$ is at a second order diffraction angle $\theta_2$ given by the expression: $\theta_2$=arcsin (λ/A). For the preferred blazed grating light valve 20, the second order diffraction angle $\theta_2$ is less than about 10°. Thus, for the preferred blazed grating light valve 20, the second order diffraction angle $\theta_2$ is approximately four times the blaze angle γ.

Neglecting a first light loss due to absorption by the metal reflectors 54 and a second light loss by the incident light I passing through gaps between adjacent pairs of the elongated elements 24, half of the incident light I is diffracted into the zeroth diffraction order $D_0$ and half of the incident light I is diffracted into the second diffraction order $D_2$.

Figure 3B:
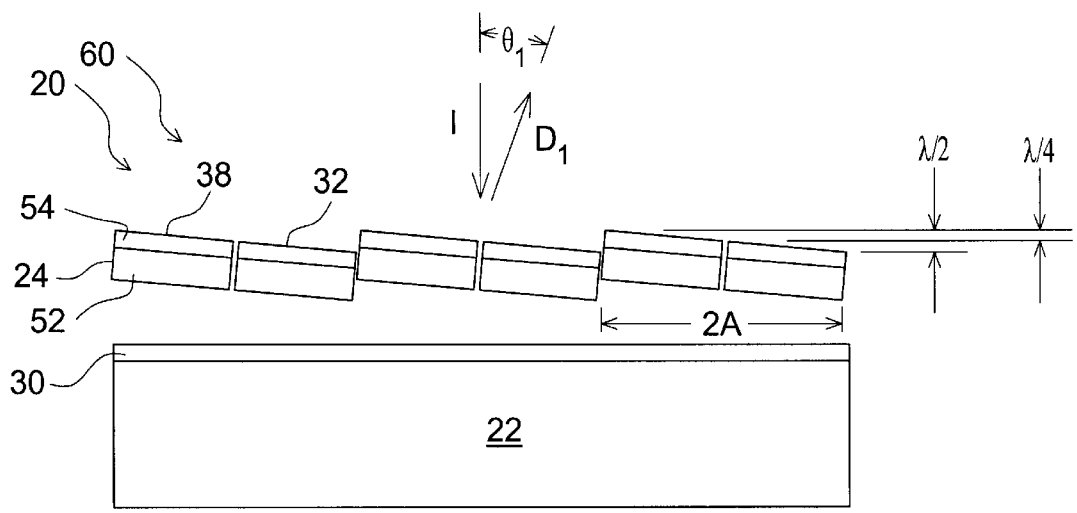

A second cross-sectional view of the preferred blazed grating light valve 20 of the present invention is illustrated in FIG. 3B. The second cross-sectional view 60 illustrates the preferred grating light valve 20 in an activated state. Preferably, to produce the activated state, alternate ones of the elongated elements 24 are moved toward the substrate 22 by applying an electrical bias between the first conductor 30 and the metal reflectors 54 of the alternate ones of the elongated elements 24. In a fully activated state, the electrical bias moves the alternate ones of the elongated elements 24 by the quarter wavelength λ/4 of the incident light I. This results in pairs of the central blazed portions 32 forming a fully activated height difference of a half wavelength λ/2 of the incident light I while maintaining the blaze angle γ.

In the fully activated state, the incident light I of the wavelength λ is diffracted into a first order diffraction $D_1$ having a first order angle $\theta_1$. The first order angle $\theta_1$ is given by the expression: $\theta_1 = \arcsin(\lambda/2\Lambda)$. For the preferred grating light valve 20 as described here, the first order angle $\theta_1$ is approximately twice the blaze angle $\gamma$.

Figure 4A:
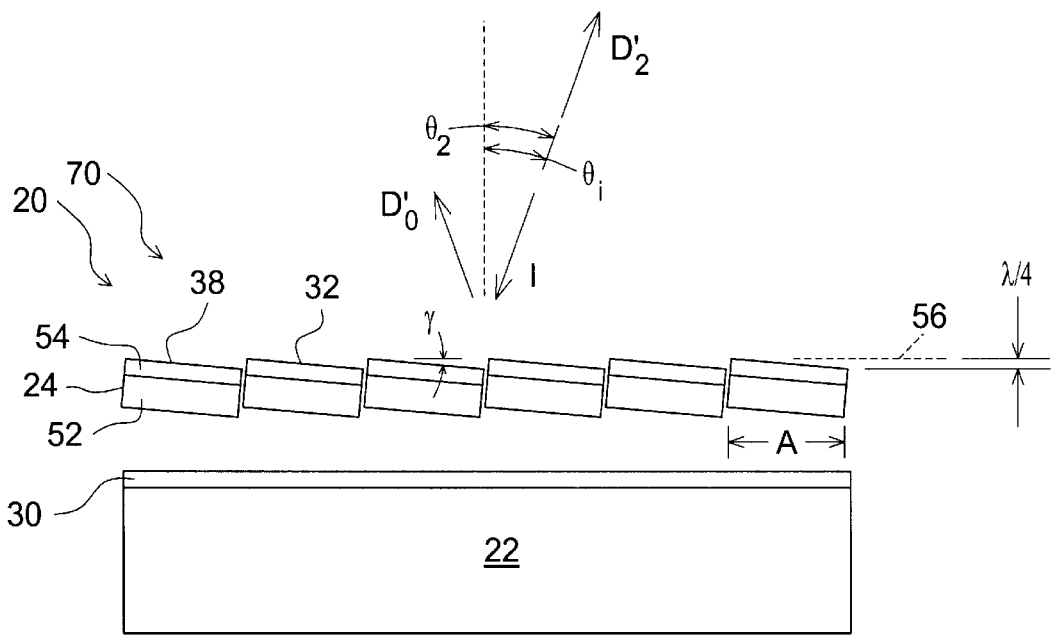
FIGS. 4A and 4B illustrate a cross-sectional view of the preferred blazed grating light valve of the present invention in the non-activated state and in the fully activated state, respectively, with incident light at an oblique incidence.

A third cross-sectional view of the preferred blazed grating light valve 20 of the present invention is illustrated in FIG. 4A. The third cross-sectional view 70 illustrates the preferred blazed grating light valve 20 in the non-activated state with the incident light I at an oblique angle $\theta_i$ to the grating plane 56. In the non-activated state, the incident light I is diffracted into an oblique zeroth order diffraction $D_0{'}$ and an oblique second order diffraction $D_2{'}$. The oblique zeroth order diffraction $D_0{'}$ is at an oblique zeroth order angle $\theta_0{'}$ with respect to the normal to the grating plane 62, which is equal to the oblique angle $\theta_i$. The oblique zeroth order angle $\theta_0{'}$ and oblique angle $\theta_i$ are given by the expression: $\theta_0{'} = \theta_i = \arcsin(\lambda/2\Lambda)$. The oblique second order diffraction $D_2{'}$ is at the oblique angle $\theta_i$.

Figure 4B:
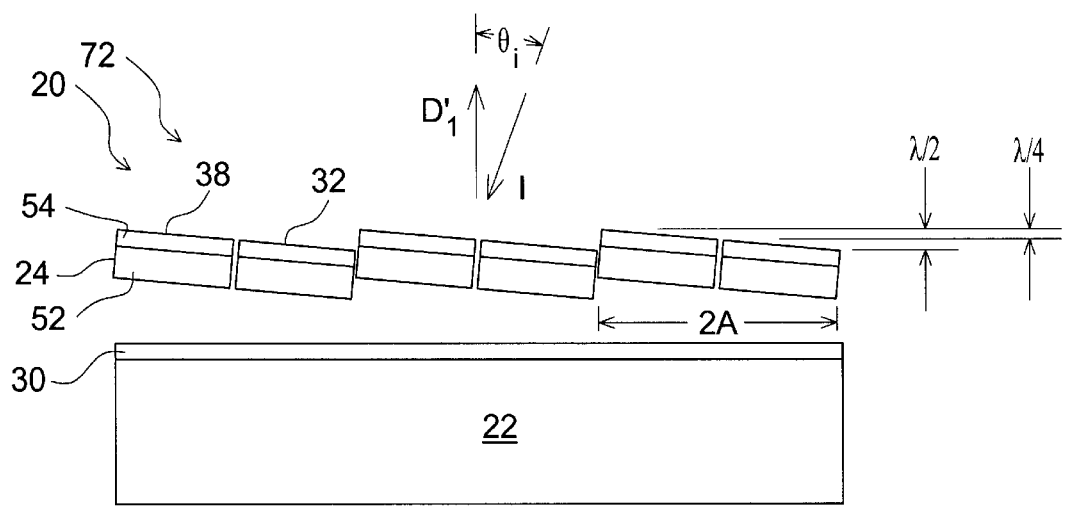

A fourth cross-sectional view of the preferred blazed grating light valve 20 of the present invention is illustrated in FIG. 4B. The fourth cross-sectional view 72 illustrates the preferred blazed grating light valve 20 in the activated state with the incident light I at the oblique angle $\theta_i$ to the grating plane 56. In the fully activated state, the incident light I is diffracted into an oblique first order diffraction $D_1{'}$, which is normal to the grating plane 56.

A first advantage of the preferred blazed grating light valve 20 is that the preferred blazed grating light valve 20 provides a blazed diffraction in the activated state while quickly switching between the non-activated state and the activated state. This is because the elongated elements are translated rather than rotated.

A second advantage of the preferred blazed grating light valve 20 is that in the non-activated state none of the incident light I is diffracted into the first diffraction order $D_1$ for the normal incidence and none of the incident light I is diffracted into the oblique first order diffraction $D_1{'}$ for the oblique incidence. In a display application where the preferred blazed grating light valve 20 produces an array of pixels and where a bright pixel corresponds to either the first diffraction order $D_1$ or the oblique first order diffraction $D_1{'}$, this provides a dark pixel of an image. In a telecommunications application, where the preferred blazed grating light valve 20 operates as a switch and where an on-state of the switch corresponds to either the first diffraction order $D_1$ or the oblique first order diffraction $D_1{'}$, this provides an off-state for the switch.

A third advantage of the preferred blazed grating light valve 20 is that, in the activated state, the incident light I is diffracted into a single diffraction order which is either the first diffraction order $D_1$ for the normal incidence or the oblique first order diffraction $D_1{'}$ for the oblique incidence. In the display application where the preferred blazed grating light valve 20 produces the array of pixels and where the bright pixel corresponds to either the first diffraction order $D_1$ or the oblique first order diffraction $D_1{'}$, this simplifies display optics since only the single diffraction order is collected to produce the bright pixel. In the telecommunications application, where the preferred blazed grating light valve 20 operates as the switch and where the on-state of the switch corresponds to either the first diffraction order $D_1$ or the oblique first order diffraction $D_1{'}$, this provides efficient utilization of the incident light I since the incident light I is diffracted into the single diffraction order.

A fourth advantage of the preferred blazed grating light valve is that because, in the non-activated state, none of the incident light I is diffracted into either the first diffraction order $D_1$ for the normal incidence or the oblique first order diffraction $D_1{'}$ for the oblique incidence and because, in the activated state, the incident light I is diffracted into the single diffraction order, the preferred blazed grating light valve 20 provides a high contrast ratio between the non-activated state and the activated state. Typically, this contrast ratio is on an order of a thousand to one. In the display application where the preferred blazed grating light valve 20 produces the array of pixels and where the bright pixel corresponds to either the first diffraction order $D_1$ or the oblique first order diffraction $D_1{'}$, this produces a high contrast image. In the telecommunications application, where the preferred blazed grating light valve 20 operates as the switch and where the on-state of the switch corresponds to either the first diffraction order $D_1$ or the oblique first order diffraction $D_1{'}$, this produces a high discrimination between the on-state and the off-state.

A fifth advantage of the preferred blazed grating light valve 20 is that, because the activated state diffracts the incident light I into the single diffraction order, a depth of focus of either the first diffraction order $D_1$ for the normal incidence or the oblique first order diffraction $D_1{'}$ for the oblique incidence is relatively long compared to a diffractive light modulator which diffracts useful light into multiple diffraction orders. In the display application where the preferred blazed grating light valve 20 produces the array of pixels and where the bright pixel corresponds to either the first diffraction order $D_1$ or the oblique first order diffraction $D_1{'}$, this allows for simpler optics. In a printing application, which is a type of display application where the bright pixel is typically used to illuminate a cylindrical drum, the longer depth of focus provides a sharper printed image.

A first partially fabricated blazed grating light valve of the present invention is illustrated in FIGS. 5A, 5B, and 5C. Fabrication of the first partially fabricated grating light valve 80 begins with a silicon substrate 82. Next, a field oxide layer 84 is formed on the silicon substrate 82 by preferably heating the silicon substrate in an oxygen atmosphere. Preferably, the field oxide layer has a thickness of about 1.0 $\mu$m. Following this, a conducting layer 86 is deposited on the field oxide layer 84. Preferably, the conducting layer 86 has a thickness of about 0.35 $\mu$m and comprises doped poly-silicon deposited using an LPCVD (low pressure chemical vapor deposition) process. Subsequently, an etch stop 88 is formed on the conducting layer 86. Preferably, the etch stop 88 comprises a second field oxide layer formed by heating the poly-silicon in the oxygen environment. Alternatively, the etch stop 88 comprises a deposited oxide or a deposited nitride. Preferably, the etch stop 88 has a thickness of about 200 Å. Next, a sacrificial layer 90 is deposited on the etch stop 88. Preferably, the sacrificial layer 90 comprises poly-silicon deposited using the LPCVD process. Preferably, the sacrificial layer 90 has a thickness about 1.0 $\mu$m. Alternatively, the sacrificial layer has a thickness greater than or about equal to a wavelength $\lambda$ of the incident light I.

A second partially fabricated blazed grating light valve of the present invention is illustrated in FIGS. 6A, 6B, and 6C. Fabrication of the second partially fabricated grating light valve 92 begins with the first partially fabricated blazed grating light valve 80 (FIGS. 5A, 5B, and 5C). Fabrication of the second partially fabricated grating light valve 92 comprises first and second etching steps using photolithography and a semiconductor etching technique, such as plasma etching. The first etching step etches shallow stress inducing features 96 into the sacrificial layer 90. The second etching step etches post holes 94 into the sacrificial layer 90 and also etches anchor holes (not shown) into the sacrificial layer 90. The anchor holes form the first and second anchors, 29 and 31 (FIG. 2B). The second etching step also etches sacrificial layer edges (not shown) where first and second ends, 38 and 40, of each of the elongated elements 24 couple to the substrate 22 (FIG. 2B).

It will be readily apparent to one skilled in the art that the semiconductor etching technique are likely to produce facets at exposed corners of the post holes 94 and at exposed corners of the stress inducing features 96.

A third partially fabricated blazed grating light valve of the present invention is illustrated in FIGS. 7A, 7B, and 7C. Fabrication of the third partially fabricated blazed grating light valve 100 begins with the second partially fabricated blazed grating light valve 92 (FIGS. 6A, 6B, and 6C). Fabrication of the third partially fabricated blazed grating light valve 100 comprises depositing a resilient material 102 on the second partially fabricated grating light valve 92 and then depositing a metal 104 on the resilient material 102. Preferably, the resilient material 102 comprises silicon nitride. Preferably, the resilient material 102 coats surfaces of the post holes 94 and the anchor holes of the second partially fabricated grating light valve 92. Alternatively, the resilient material 102 more substantially fills the post holes 94 and the anchor holes. Further alternatively, the resilient material fills the post holes 94 and the anchor holes. (Note that FIGS. 7A and 7B depict the resilient material 102 filling the post holes 94 as a simplification for more easily understood illustrations.) Preferably, the resilient material 102 has a thickness of about 920 Å and is deposited using an LPCVD process. Preferably, the resilient material has an internal tensile stress of about 1 GPa. Preferably, the metal 104 comprises aluminum. Preferably, the metal 104 has a thickness of 500 Å. Preferably, the metal 104 is deposited using a physical vapor deposition technique, such as sputtering or evaporation.

A fourth partially fabricated blazed grating light valve of the present invention is illustrated in FIGS. 8A, 8B, and 8C. Fabrication of the fourth partially fabricated blazed grating light valve 106 begins with the third partially fabricated blazed grating light valve 100 (FIGS. 7A, 7B, and 7C) and comprises etching the metal layer 104 and the resilient material 102 to form fabricated elongated elements 24A supported by the sacrificial layer 90.

A fabricated blazed grating light valve of the present invention is illustrated in FIGS. 9A, 9B, and 9C. Fabrication of the fabricated blazed grating light valve 110 begins with fourth partially fabricated blazed grating light valve 106 (FIGS. 8A, 8B, and 8C) and comprises etching the sacrificial layer 90 to completion using a xenon difluoride etch. This produces fabricated elongated elements 24A comprising fabricated central blazed portions 32A coupled to first and second fabricated posts, 26A and 28A, by first and second fabricated blaze transitions, 34A and 36A. The first and second fabricated posts, 26A and 28A, couple the fabricated elongated elements 24A to a fabricated substrate 22A.

FIG. 9D illustrates a cross-section of one of the fabricated elongated elements 24A through the fabricated central blaze portion 32A. The first and second fabricated blaze transitions, 34A and 36A (FIG. 9B), cause the fabricated cental blaze portion 32A to orient to a desired blaze angle γ' upon release of the fabricated elongated elements 24A by the xenon difluoride etch.

It will be readily apparent to one skilled in the art that suitable electrical connections for the fabricated blazed grating light valve 110 comprise bond pads, which are well known both in structure and fabrication. Further, it will be readily apparent to one skilled in the art that the fabricated blazed grating light valve 110 is a particular embodiment of the present invention and that accordingly the preferred blazed grating light valve 20 more generally describes the present invention.

Figure 10:
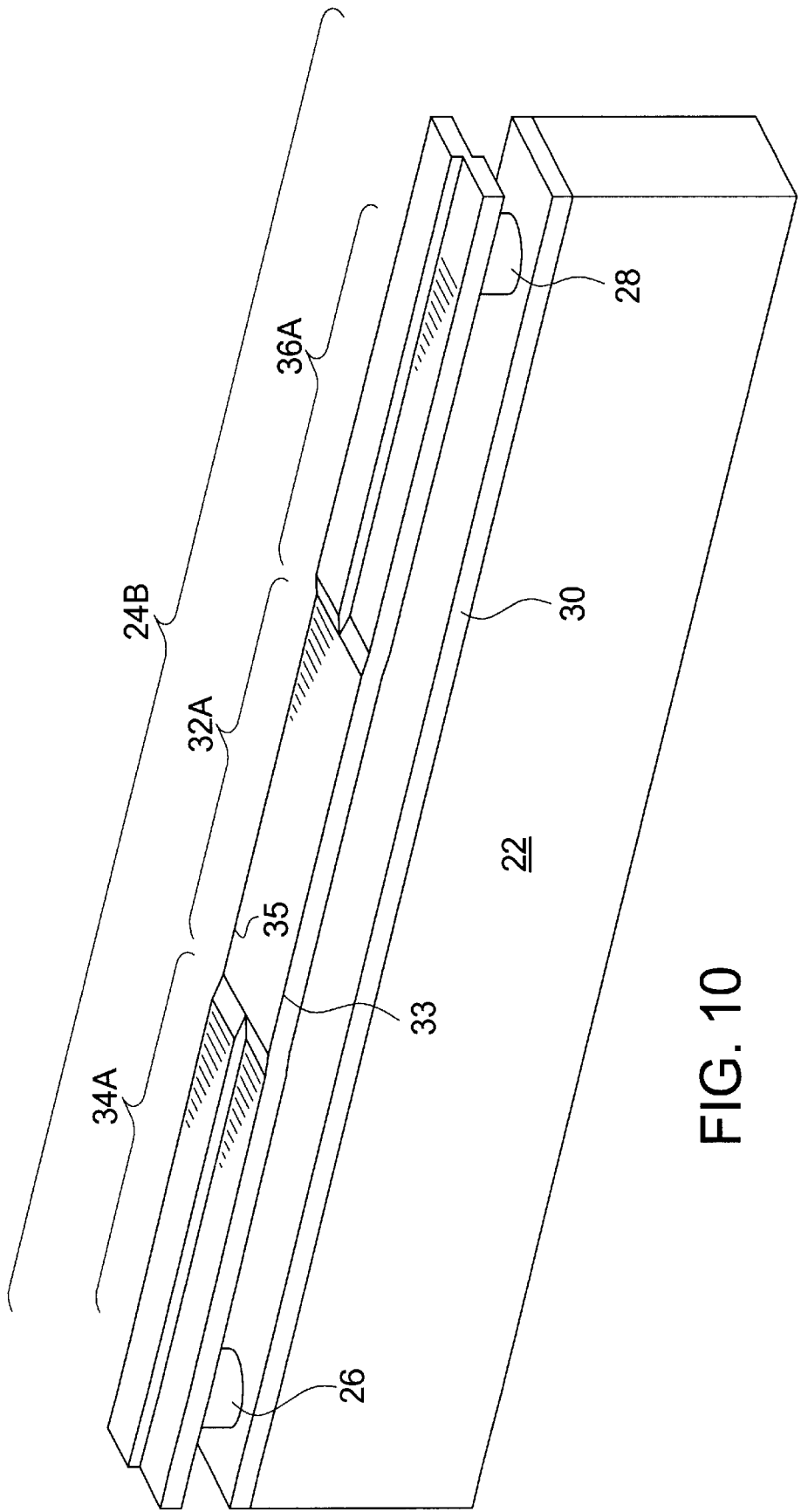
FIG. 10 illustrates an alternative elongated element and the underlying substrate of the present invention.

A first alternative elongated element and the underlying substrate 22 of the present invention are illustrated in FIG. 10. The first alternative elongated element 24B comprises an alternative central blazed portion 32A coupling first and second alternative blaze transitions, 34A and 36A. The first and second alternative blaze transitions comprise a symmetrical step at ends of the alternative central blazed portion 32A causing the near side 33 of the alternative central blazed portion 32A to tilt downward while causing a far side 35 of the alternative central blazed portion 32A to tilt upward.

It will be readily apparent to one skilled in the art that other various modifications may be made to the preferred embodiment without departing from the spirit and scope of the invention as defined by the appended claims.

We claim:

1. A light modulator comprising:
   a. elongated element arranged parallel to each other and configured in a grating plane, each elongated element comprising a central blazed portion, a first outer blaze transition, and a second outer blaze transition, the central blaze portion coupling the first outer blaze transition to the second outer blaze transition, each central blazed port on comprising a reflective surface such that in operation an incident light illuminating the central blazed portions diffracts into at least two diffraction orders; and
   b. means for adjusting a height of selected ones of the elongated elements relative to the grating plane such that in operation the incident light diffracts into a single diffraction order different than the at least two diffraction orders.

2. The light modulator of claim 1 wherein the means for adjusting the height of the selected ones of the elongated elements comprise:
   a. a first conductive element along the central blazed portion of each of the selected ones of the elongated elements; and
   b. a substrate coupled to the elongated elements, the substrate comprising a second conductive element such that an electrical bias applied between the first conductive elements and the second conductive element adjusts the height of the selected ones of the elongated elements.

3. The light modulator of claim 2 further comprising first and second posts, the first post coupling each of the elongated elements along the first outer blaze transition to the substrate, the second post coupling each of the elongated elements along the second outer blaze transition to the substrate.

4. The light modulator of claim 1 wherein the selected ones of the elongated elements comprise every other ones of the elongated elements.

5. The light modulator of claim 4 wherein the incident light illuminates the central blaze portions of the elongated elements normal to the grating plane such that the at least two diffraction orders comprise a zeroth diffraction order normal to the grating plane and a second diffraction order at a second order blaze angle of about an arcsin of one quarter of a light wavelength divided by a pitch of the elongated elements.

6. The light modulator of claim 5 wherein the incident light illuminates the central blaze portions of the elongated elements normal to the grating plane such that the single diffraction order comprises a first order diffraction at a first order angle given by the arcsin of one quarter of the light wavelength divided by twice the pitch.

7. The light modulator of claim 1 wherein the central blazed portion comprises a rectangular cross section.

8. The light modulator of claim 7 wherein the rectangular cross section of the central blaze portion has been rotated to a blaze angle by a combination of a residual stress within the elongated element and a rigidity of the first and second outer blaze transitions.

9. A light modulator comprising:
   a. elongated elements arranged parallel to each other and configured in a grating plane, each elongated element comprising a central blazed portion, a first outer blaze transition, and a second outer blaze transition, the central blaze portion coupling the first outer blaze transition to the second outer blaze transition, selected ones of the central blazed portions comprising a first conductive element, each of the central blazed portions comprising a reflective surface such that in operation an incident light illuminating the central blazed portions diffracts into at least two diffraction orders; and
   b. a substrate coupled to the elongated elements, the substrate comprising a second conductive element such that in operation an electrical bias applied between the first conductive elements and the second conductive element adjusts a height of the selected ones of the elongated elements and further such that in operation the incident light diffracts into a single diffraction order different than the at least two diffraction orders.

10. A light modulator comprising:
    a. elongated elements arranged parallel to each other and configured in a grating plane, each elongated element having a rectangular cross section and configured with a blaze angle, each of selected ones of the elongated elements comprising a first conductive element, each elongated element comprising a reflective surface such that in operation an incident light diffracts into at least two diffraction orders; and
    b. a substrate coupled to the elongated elements, the substrate comprising a second conductive element such that in operation an electrical bias applied between the first conductive elements and the second conductive element adjusts a height of the selected ones of the elongated elements and further such that in operation the incident light diffracts into a single diffraction order different than the at least two diffraction orders.

11. A light modulator comprising:
    a. means for stress inducing a blaze angle into elongated elements arranged parallel to each other and configured in a grating plane such that in operation an incident light diffracts into at least two diffraction orders; and
    b. means for adjusting height of selected ones of the elongated elements relative to the grating plane such that in operation the incident light diffracts into a single diffraction order different than the at least two diffraction orders.

12. A method of fabricating a light modulator comprising the steps of:
    a. depositing a sacrificial layer on a substrate;
    b. etching first outer blaze transition producing features and second outer blaze transition producing features into the sacrificial layer;
    c. depositing a resilient material on the sacrificial layer;
    d. etching the resilient material to form elongated elements supported by the sacrificial layer; and
    e. etching the sacrificial layer to completion leaving the elongated elements coupled to the substrate, each of the elongated elements comprising a central blazed portion, a first outer blaze transition, and a second outer blaze transition, the first outer blaze transition coupled to the second outer blaze transition by the central blazed portion.

13. The method of claim 12 further comprising the steps of:
    a. forming an oxide layer on the substrate between the substrate and the sacrificial layer prior to depositing the sacrificial layer; and
    b. depositing a first conducting layer on the substrate between the oxide layer and the sacrificial layer prior to depositing the sacrificial layer.

14. The method of claim 13 wherein the substrate comprises silicon and further wherein the oxide layer comprises a field oxide layer of silicon dioxide.

15. The method of claim 13 wherein the first conducting layer comprises doped poly-silicon.

16. The method of claim 15 further comprising the step of depositing an etch stop on the doped poly-silicon between the doped poly-silicon and the sacrificial layer.

17. The method of claim 16 further comprising the step of etching first post holes and second post holes through the sacrificial layer.

18. The method of claim 17 wherein sacrificial layer comprises poly-silicon.

19. The method of claim 18 wherein the step of etching the sacrificial layer to completion comprises a xenon difluoride dry etch.

20. The method of claim 17 wherein the step of depositing the resilient material further comprises depositing the resilient material within the first and second post holes, thereby forming first and second posts.

21. The method of claim 20 wherein the resilient material comprises silicon nitride.

22. The method of claim 21 further comprising the step of depositing a reflective material on the resilient material.

23. The method of claim 22 wherein the reflective material comprises aluminum.

24. The method of claim 22 wherein the step of etching the resilient material further comprises etching the reflective material.

25. The method of claim 20 wherein each of the elongated elements are supported by one of the first posts and by one of the second posts, the first post supporting the first outer blaze transition, the second post supporting the second outer blaze transition.

* * * * *

UNITED STATES PATENT AND TRADEMARK OFFICE
CERTIFICATE OF CORRECTION

PATENT NO. : 6,639,722 B2
DATED : October 28, 2003
INVENTOR(S) : Amm et al.

It is certified that error appears in the above-identified patent and that said Letters Patent is hereby corrected as shown below:

<u>Title page,</u>
Item [56], References Cited, add the following U.S. PATENT DOCUMENTS:
-- 5,919,548    07/06/99    Barron et al.    428    138    08/20/97
   6,069,392    05/30/00    Tai et al.       257    419    04/08/98
   6,115,168    09/05/00    Zhao et al.      359    247    10/29/98
   6,123,985    09/26/00    Robinson et al.  427    162    10/28/98 --; and
add the following FOREIGN PATENT DOCUMENTS:
-- WO 01/04674 A1    01/18/01    WO    G02B    6/12 --
Item [57], ABSTRACT, after the sentence "In the first diffraction mode, an incident light diffracts into at least two diffraction orders.", add the sentence -- In the second diffraction mode, the incident light diffracts into a single diffraction order. --.

<u>Column 3,</u>
Lines 50-51, there is not a new paragraph after the first sentence.

<u>Column 7,</u>
Lines 9 and 10, please replace "exposed comers" with -- exposed corners --.

<u>Column 8,</u>
Line 29, please replace "central blazed port on comprising" with -- central blazed portion comprising --.

Signed and Sealed this

Ninth Day of March, 2004

JON W. DUDAS
*Acting Director of the United States Patent and Trademark Office*